(12) United States Patent
Yowler et al.

(10) Patent No.: US 10,627,702 B2
(45) Date of Patent: Apr. 21, 2020

(54) CONFIGURABLE LIGHT FIXTURE FOR PHOTOGRAPHY

(71) Applicant: Matthews Studio and Equipment, Inc., Burbank, CA (US)

(72) Inventors: Jay Ward Yowler, Valley Villlage, CA (US); Edward Tyler Phillips, IV, Burbank, CA (US); Steven Neil Strong, Los Angeles, CA (US)

(73) Assignee: MATTHEWS STUDIO EQUIPMENT, INC., Burbank, CA (US)

(*) Notice: Subject to any disclaimer, the term of this patent is extended or adjusted under 35 U.S.C. 154(b) by 0 days.

(21) Appl. No.: 16/125,599

(22) Filed: Sep. 7, 2018

(65) Prior Publication Data

US 2019/0079371 A1    Mar. 14, 2019

Related U.S. Application Data

(60) Provisional application No. 62/555,855, filed on Sep. 8, 2017.

(51) Int. Cl.
| | | |
|---|---|---|
| G03B 15/02 | (2006.01) | |
| F21V 19/00 | (2006.01) | |
| G03B 17/56 | (2006.01) | |
| F21Y 103/00 | (2016.01) | |

(52) U.S. Cl.
CPC ............ *G03B 15/02* (2013.01); *F21V 19/009* (2013.01); *F21V 19/0075* (2013.01); *F21Y 2103/00* (2013.01); *G03B 17/561* (2013.01); *G03B 2215/0514* (2013.01)

(58) Field of Classification Search
CPC ....... F21V 19/0075–0095; F21S 6/005; G03B 15/02; F16B 2/12; Y10T 24/44974
See application file for complete search history.

(56) References Cited

U.S. PATENT DOCUMENTS 991,167 A * 5/1911 Parkinson .............. B60J 7/1855
                                          24/134 R
5,276,949 A * 1/1994 Cordellini ................. F16B 2/12
                                          24/525

* cited by examiner

*Primary Examiner* — Mariceli Santiago
(74) *Attorney, Agent, or Firm* — Cotman IP Law Group

(57) ABSTRACT

A configurable light fixture for photography is presented. The light fixture includes a rail with a clamp section and threaded section. A fixed jaw is removably coupled to an end of the rail in the clamp section. One or more optional sliding intermediate jaws may be slidably coupled to the rail in the clamp section below the fixed jaw to create more clamping surfaces when desired to hold more than one lighting tube. A sliding end jaw is slidably coupled to the rail in the clamp section below the sliding intermediate jaw. A wing nut is coupled to the threaded section of the rail for applying linear pressure on the sliding end jaw thereby secure a lighting tube on each of the clamping surfaces.

7 Claims, 3 Drawing Sheets

CONFIGURABLE LIGHT FIXTURE FOR PHOTOGRAPHY

CROSS-REFERENCE TO RELATED APPLICATIONS

The present application claims the benefit of U.S. Provisional Application Ser. No. 62/555,855, filed on Sep. 8, 2017, specification of which is herein incorporated by reference for completeness of disclosure.

BACKGROUND OF THE INVENTION

Field of the Invention

Embodiments of the invention relates to the field of light fixtures. More specifically, the invention relates to a configurable light fixture for photography.

BRIEF SUMMARY OF THE INVENTION

One or more embodiments of the invention are directed a configurable light fixture for photography. The invention comprises an improved mount for lighting tubes used in the motion picture and photography industry. A strong lightweight mount that can securely hold lighting tubes of different lengths without risk of damage from crushing of the tube. The clamping jaws apply and release pressure on lighting tubes of various form factors, e.g. standard T12, T10, T8, T5 tubes, or any other lighting tube configuration.

In one or more embodiments, the clamping jaws are comprised of concave semicircular ends of which when combined create a radial griping face which cannot be compressed beyond the diameter of the lighting tube.

In one or more embodiments, the clamping jaws are modular in design making them stackable so the mount can be configured to hold a plurality of lighting tubes. The clamping jaws consist of one fixed jaw and one or more sliding jaws which slide on a shaft (or rail) thereby keeping the jaws aligned to each other.

In one or more embodiments, the shaft (rail) running through the jaws has a square end and threaded end, e.g. with Acme threads, of which the square end provides clearance for the sliding jaws and the threaded end provides a means for applying clamping pressure in a linear direction. On either end of the clamp, a mounting receiver with an industry standard access point may be affixed to provide a mounting point for coupling the configurable light fixture to a multitude of industry standard equipment.

One or more embodiments of the invention comprises a rail with a clamp section and threaded section. A fixed jaw that is removably coupled to an end of the rail in the clamp section. The fixed jaw comprises a downward facing angled brace body with a first section of a first clamping surface on the fixed jaw's front side.

One or more embodiments of the invention further comprises one or more sliding intermediate jaws slidably coupled to the rail in the clamp section below the fixed jaw. The sliding intermediate jaw comprises an upward facing angled brace body with a second section of a first clamping surface on its top-front side and a downward facing angled brace body with a first section of a second clamping surface on its bottom-front side. The clamp section of the rail is configured to keep the sliding intermediate jaw aligned with the fixed jaw.

One or more embodiments of the invention further comprises a sliding end jaw slidably coupled to the rail in the clamp section below the sliding intermediate jaw. The sliding end jaw comprises an upward facing angled brace body with a second section of the second clamping surface on the sliding end jaw's front side. The clamp section of the rail is configured to keep the sliding end jaw aligned with the fixed jaw and the sliding intermediate jaw.

One or more embodiments of the invention further comprises a wing nut coupled to the threaded section of the rail. The wing nut is configured to apply linear pressure on the sliding end jaw to secure a lighting tube on each of the clamping surfaces.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1A:
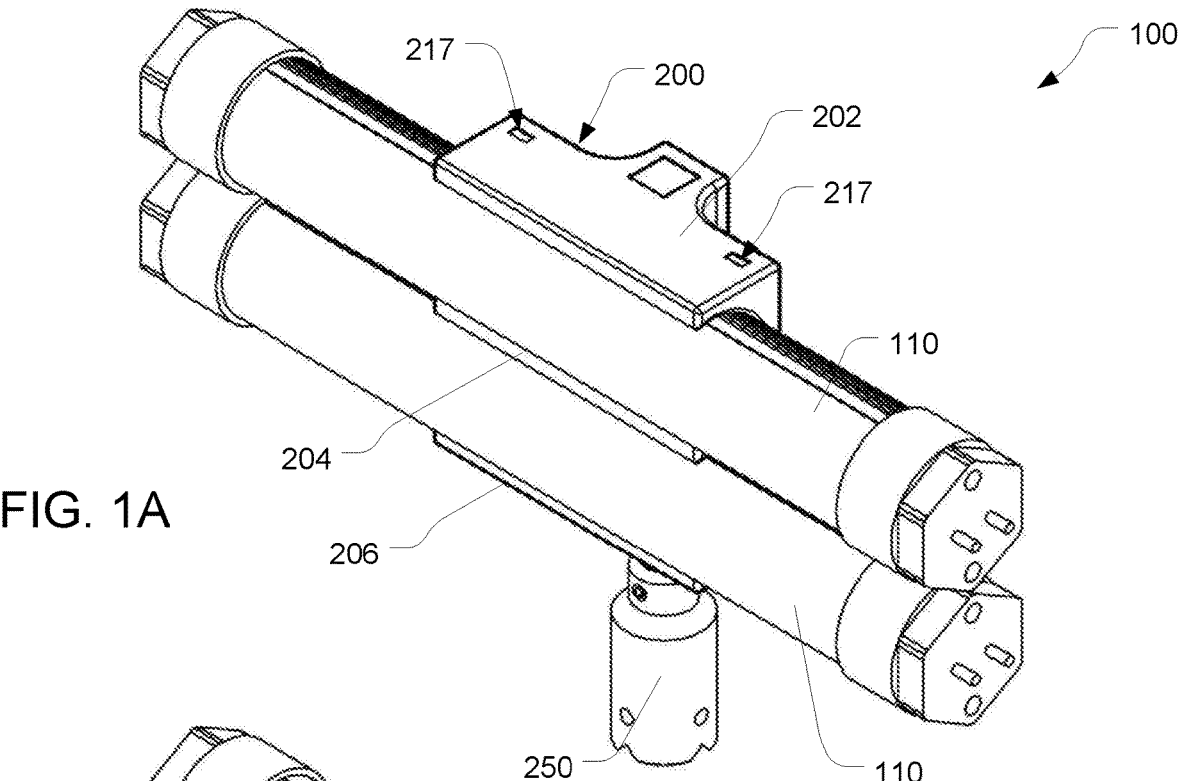
FIG. 1A is a front isometric view of the configurable light fixture with two lighting tubes in accordance with one or more embodiments of the present invention.
Figure 1B:
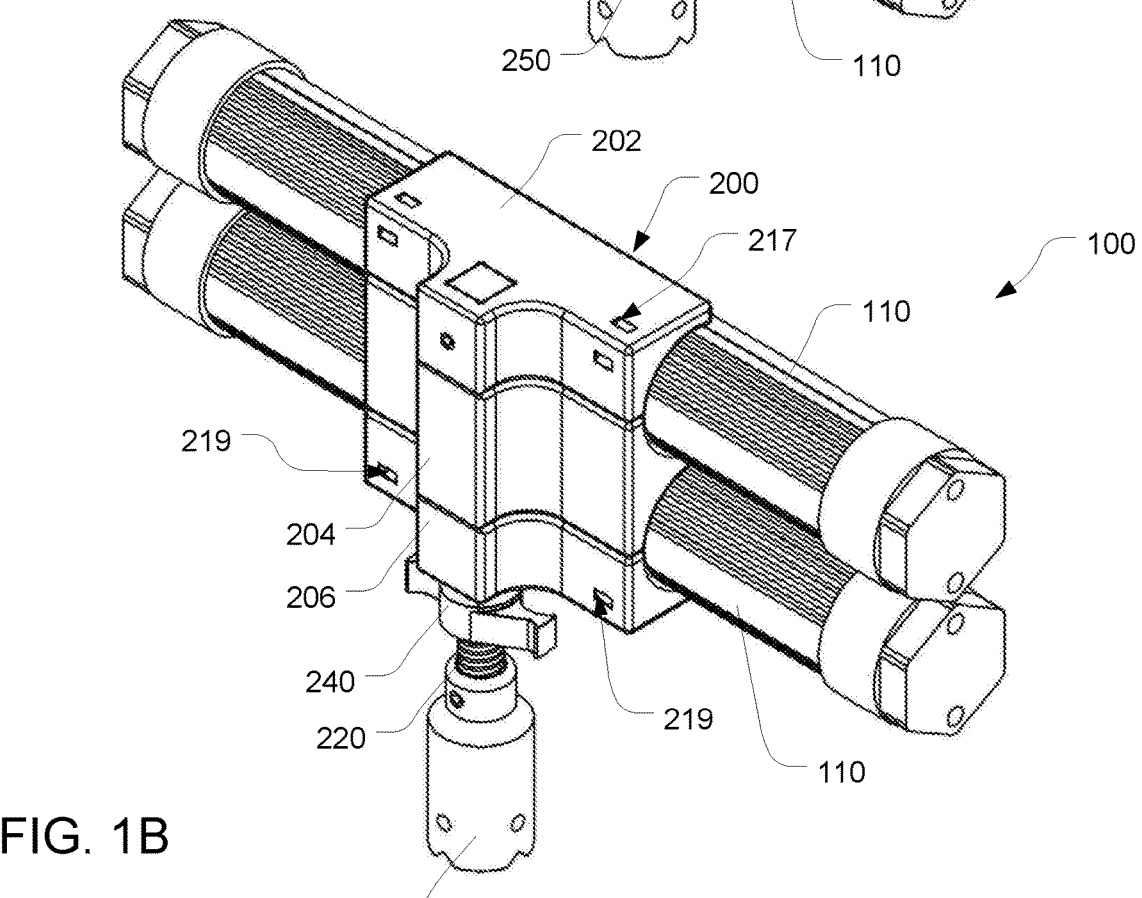
FIG. 1B is a rear isometric view of the configurable light fixture with two lighting tubes in accordance with one or more embodiments of the present invention.
Figure 1C:
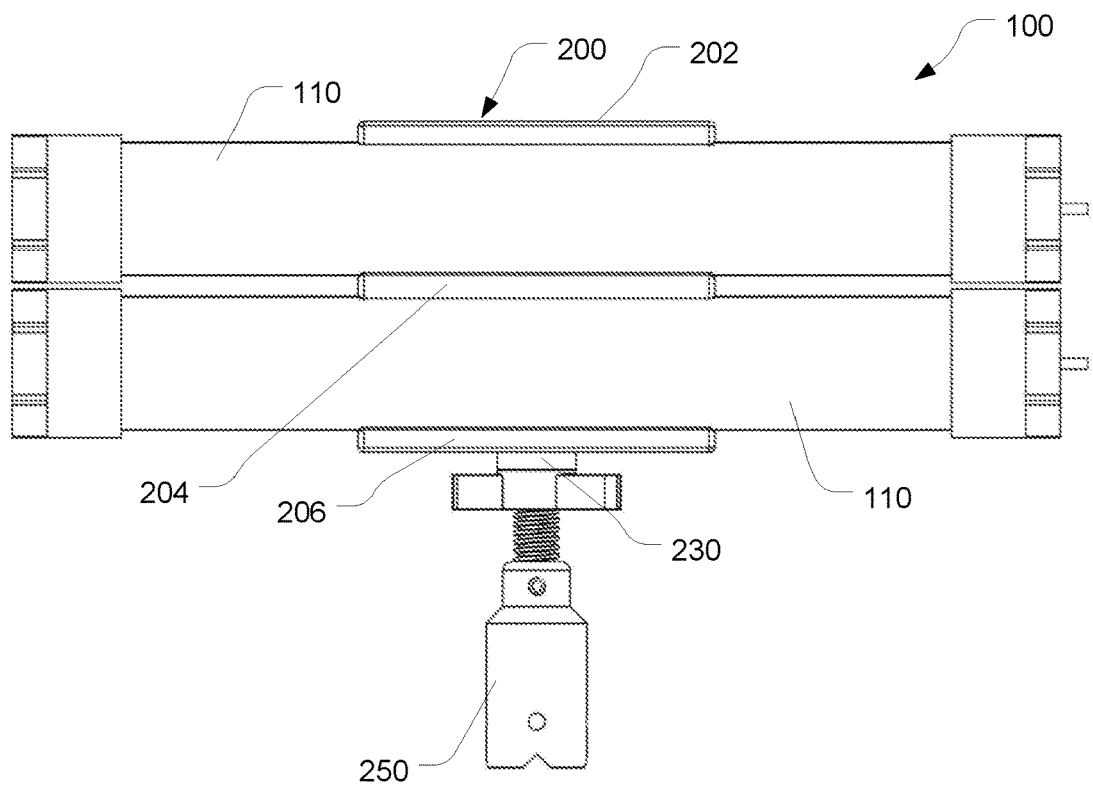
FIG. 1C is a front side view of the configurable light fixture with two lighting tubes in accordance with one or more embodiments of the present invention.
Figure 1D:
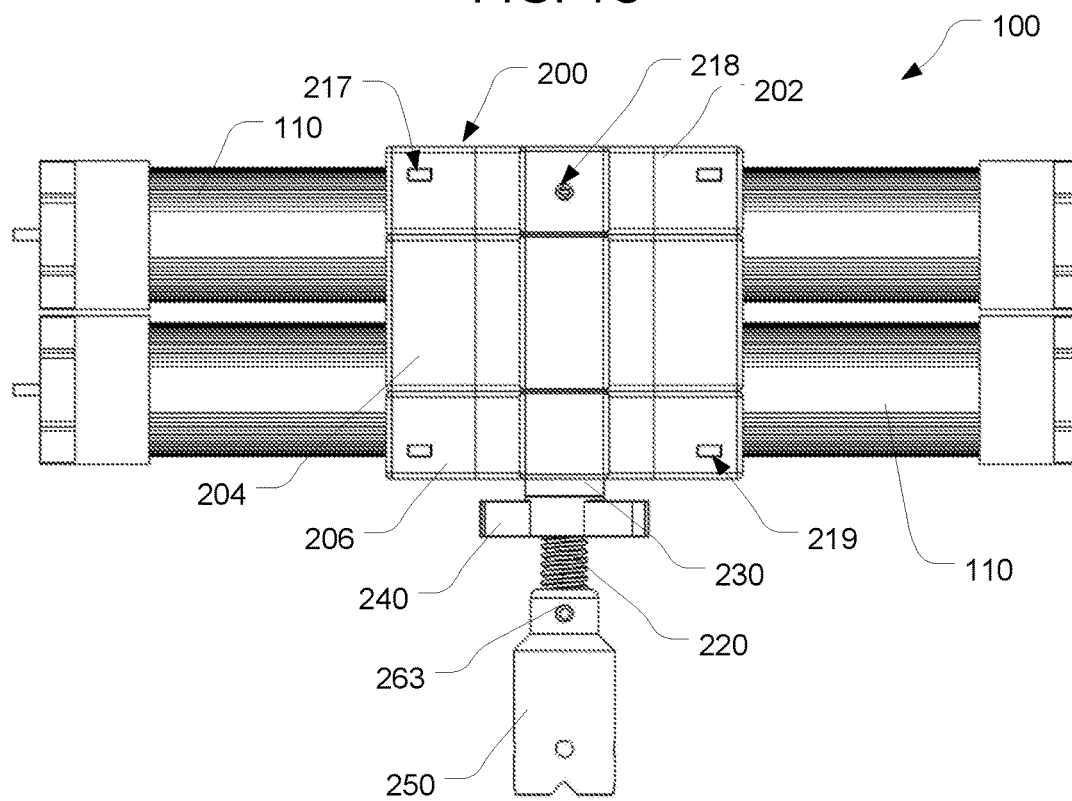
FIG. 1D is a rear side view of the configurable light fixture with two lighting tubes in accordance with one or more embodiments of the present invention.

The present invention comprising a configurable light fixture for photography will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more embodiments of the present invention will now be described with references to FIGS. 1-2.

On or more embodiments of the present invention comprises an improved mount for lighting tubes used in the motion picture and photography industry. As illustrated in FIGS. 1A-D, the fixture 100 comprises strong lightweight light fixture 200 that can securely hold one or more lighting tubes, e.g. 110, of different lengths and sizes without risk of damage from crushing any of the lighting tubes, e.g. 110.

Figure 2:
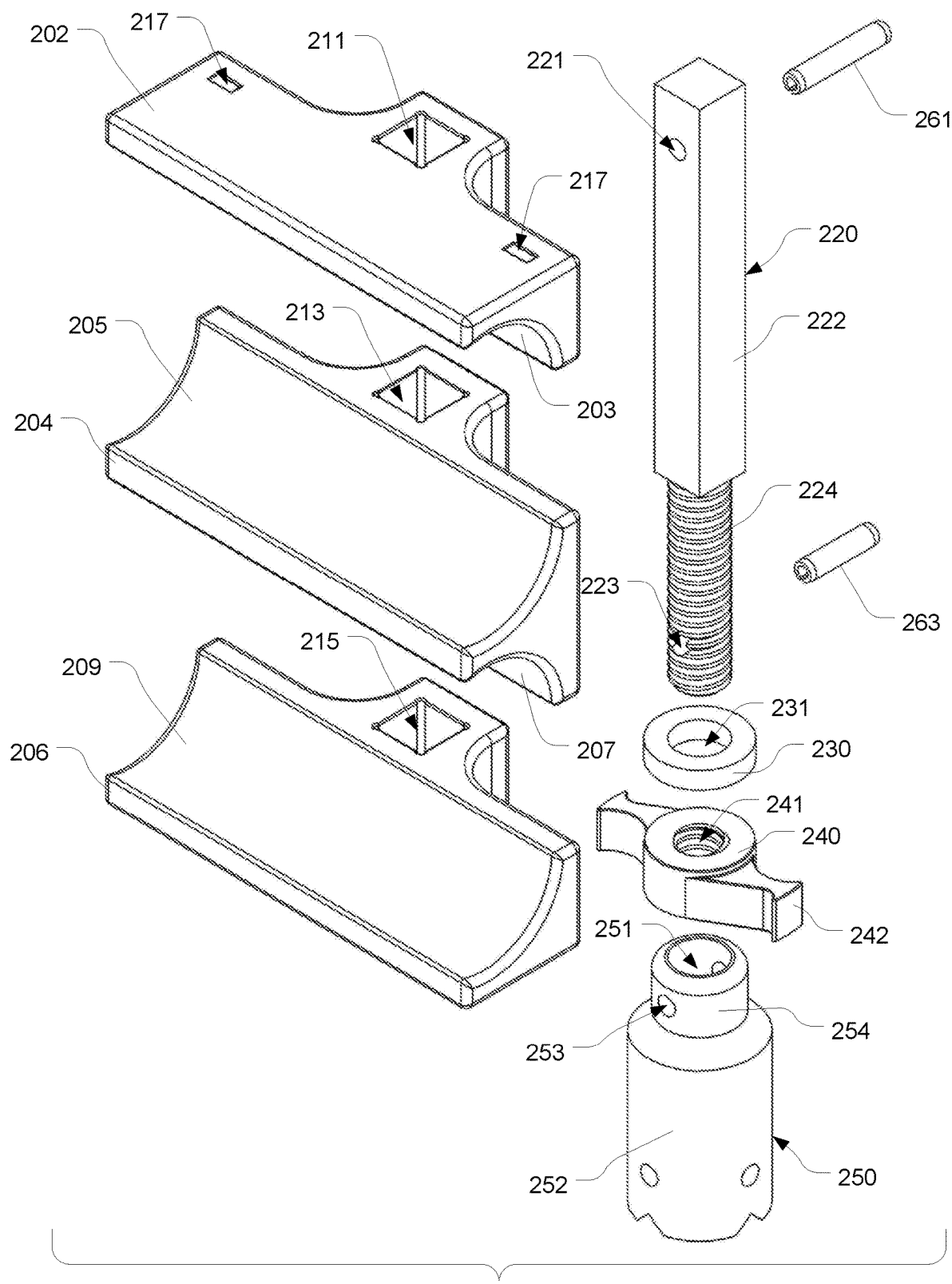
FIG. 2 is an exploded view of the configurable light fixture of the light fixture in accordance with one or more embodiments of the present invention.

FIG. 2 is an exploded view of the configurable light fixture 200 in accordance with one or more embodiments of the present invention. As illustrated, the configurable light fixture comprises a rail (or shaft) 220; a fixed jaw 202; zero or more sliding intermediate jaws 204; and a sliding end jaw 206.

Thus, in one or more embodiments, the sliding intermediate jaw 204 is optional. For instance, for configurations where only one lighting tube 110 is needed, the sliding intermediate jaw is not required. However, a sliding intermediate jaw is needed for each additional lighting tube 110 being secured to the light fixture 200.

In one or more embodiments, rail 220 comprises a clamp section 222 and a threaded section 224. The length of clamp section 222 may depend on the desired number and size of lighting tubes to be secured. At the top end of clamp section 222 is an orifice 221 through which pin 261 is used to secure the fixed jaw 202 to the rail. The threaded section 224 provides a means for applying clamping pressure in a linear direction. Those of skill in the art would appreciate that the rail 220 can take other shapes, e.g. square, triangular, rectangular, hexagonal, rhombus, etc., so long as the rail is configured to keep the jaws aligned. For instance, rail 220 may include a key (not shown) along the length of clamp section 222, wherein the key is configured to slide into a slot (not shown) in channels 221, 213, and 215, thereby keeping the jaws aligned with respect to each other. The bottom end of threaded section 224 further includes an orifice 223 configured to retain pin 263.

Threaded section 223 is configured to retain washer 231 and a wing nut 240. Washer 230 comprises a lumen 231 with diameter configured to fit threaded section 224. The bottom end of clamp section 222 acts as a stop or travel limit for washer 230.

Wing nut 240 comprises a threaded lumen 241 with diameter configured to fit threaded section 224 and arms 242 for using the fingers to tighten or loosen the grip of the clamps.

In one or more embodiments, a mounting receiver, e.g. 250, configured to removably mount on industry standard fixtures may be affixed on either end of the rail 220 to provide an external mounting point for the configurable light fixture 200 onto a multitude of industry standard equipment. Receiver 250 comprises a base 252 configured for mounting to the industry standard fixture, and a neck 254 configured for securing to rail 220. Neck 254 includes a lumen 251 for securing the receiver to the bottom end of threaded section 224 of rail 220 using pin 263 through orifice 223 and orifice 253 in neck 254.

In one or more embodiments, the light fixture 200 comprises a plurality of clamping jaws configured to apply and release pressure on various lighting tubes of different form factors, e.g. standard tubes T12, T10, T8, T5, etc. In the exemplary embodiment, each clamping jaw, e.g. 202, 204 and 206, comprises a clamping surface that is angled, e.g. concave in the shape of a quadrant of a circle (e.g. 203, 205, 207, and 209) such that when two are combined, e.g. 203 and 205, or 207 and 209, they together form a griping surface, e.g. semi cylindrical, that firmly grips a lighting tube.

The clamping jaws, e.g. 202, 204 and 206, are modular and stackable enabling light fixture 200 to be configurable to hold one or more lighting tubes. The clamping jaws consist of a fixed jaw 202, one or more sliding intermediate jaws, e.g. 204, and a sliding end jaw 206. The sliding intermediate and sliding end jaws, i.e. 204 and 206, are configured to slide vertically along the length of clamp section 222 of rail 220 while remaining aligned.

In one or more embodiments, the fixed jaw 202 comprises a downward facing angled brace body with a clamping surface 203 on the front side. Clamping surface 203 may be substantially concave, e.g. in the shape of a quadrant of the inside surface of a cylindrical tube. The backside of fixed jaw 202 comprises a vertical channel 211 that is configured to be secured top of rail 220 using pin 261 through orifice 221. Thus, the backside of fixed jaw 202 includes a hole 218 (See FIGS. 1B and 1D), which aligns with orifice 221 on the rail, and through which pin 261 fixedly secures the rail to the fixed jaw.

In one or more embodiments, the fixed jaw 202 further comprises one or more pass through slots 217 on both ends for optionally securing the clamp to external devices. As illustrated, each slot 217 extends from the top to the back of the jaw.

In one or more embodiments, the sliding jaw components comprise an optional sliding intermediate jaw 204 and a sliding end jaw 206. In the illustrated examples of FIGS. 1A-D, light fixture 200 is configured for two tubes, thus requiring one sliding intermediate jaw 204 and one sliding end jaw 206. To configure for more than the illustrated two tubes, the user simply adds additional sliding intermediate jaw components 204 as needed. For example, to configure for three lighting tubes, the sliding jaw components would comprise two sliding intermediate jaws 204 and one sliding end jaw 206. That is, such a configuration would comprise a fixed jaw 202 at the top, followed by a first sliding intermediate jaw 204, followed by a second sliding intermediate jaw 204, and finally a sliding end jaw 206.

In one or more embodiments, the sliding intermediate jaw 204 comprises an upward facing angled brace with a clamping surface 205 on its top front side and a downward facing angled brace with a clamping surface 207 on its bottom front side. Each of clamping surface 205 and 207 may be substantially concave, e.g. in the shape of a quadrant of the inside surface of a cylindrical tube. The backside of sliding intermediate jaw 204 comprises a vertical channel 213 that is configured to freely and vertically slide along clamp section 222 of rail 220. Vertical channel 213 is configured to substantially align with vertical channel 211 of fixed jaw 202 and vertical channel 215 of sliding end jaw 206.

In one or more embodiments, the sliding end jaw 206 comprises an upward facing angled brace body with a clamping surface 209 on the front side. Clamping surface 209 may be substantially concave, e.g. in the shape of a quadrant of the inside surface of a cylindrical tube. The backside of sliding end jaw 206 comprises a vertical channel 215 that is configured to freely and vertically slide along clamp section 222 of rail 220. Vertical channel 215 is configured to substantially align with vertical channel 211 of fixed jaw 202 and vertical channel 213 of sliding intermediate jaw 204.

In one or more embodiments, the sliding end jaw 206 further comprises one or more pass through slots 219 on both ends for optionally securing the clamp to external devices. As illustrated, each slot 219 extends from the bottom to the back of the jaw.

While the invention herein disclosed has been described by means of specific embodiments and applications thereof, numerous modifications and variations could be made thereto by those skilled in the art without departing from the scope of the invention set forth in the claims.

What is claimed is:

1. A configurable light fixture comprising:
   a rail comprising a clamp section and threaded section, the clamp section having a rectangular cross-section;
   a fixed jaw removably coupled to an end of the rail in the clamp section, wherein the fixed jaw comprises a downward facing right angled brace body on the front side;
   a sliding end jaw slidably coupled to the rail in the clamp section below the fixed jaw, wherein the sliding end jaw comprises an upward facing right angled brace body on the front side, wherein the rectangular cross-section of the clamp section of the rail keeps the sliding end jaw aligned with the fixed jaw; and
   a wing nut coupled to the threaded section of the rail, wherein the wing nut is configured to apply linear pressure on said sliding end jaw to secure a lighting tube.

2. The configurable light fixture of claim 1, wherein the inside surface of the right angled brace body is configured as a quadrant of a cylindrical tube.

3. The configurable light fixture of claim 1, further comprising:
   a sliding intermediate jaw slidably coupled to the rail in the clamp section between the fixed jaw and the sliding end jaw, wherein the sliding intermediate jaw comprises an upward facing right angled brace body on its top-front side and a downward facing right angled brace body on its bottom-front side, wherein the rectangular cross-section of the clamp section of the rail keeps the sliding intermediate jaw aligned with the fixed jaw and the sliding end jaw.

4. A configurable light fixture comprising:
   a rail comprising a clamp section and threaded section;
   a fixed jaw removably coupled to an end of the rail in the clamp section, wherein the fixed jaw comprises a downward facing right angled brace body with a first section of a first clamping surface on the fixed jaw's front side, wherein the first section of the first clamping surface is configured as a quadrant of a cylindrical tube;
   one or more sliding intermediate jaws slidably coupled to the rail in the clamp section below the fixed jaw, wherein the sliding intermediate jaw comprises an upward facing right angled brace body with a second section of a first clamping surface on its top-front side and a downward facing right angled brace body with a first section of a second clamping surface on its bottom-front side, wherein the second section of the first clamping surface and the first section of the second clamping surface are configured as the quadrant of a cylindrical tube, wherein the clamp section of the rail is configured to keep the sliding intermediate jaw fixedly aligned with the fixed jaw;
   a sliding end jaw slidably coupled to the rail in the clamp section below the sliding intermediate jaw, wherein the sliding end jaw comprises an upward facing right angled brace body with a second section of the second clamping surface on the sliding end jaw's front side, wherein the second section of the second clamping surface is configured as a quadrant of the cylindrical tube, wherein the clamp section of the rail is configured to keep the sliding end jaw fixedly aligned with the fixed jaw and the sliding intermediate jaw; and
   a wing nut coupled to the threaded section of the rail, wherein the wing nut is configured to apply linear pressure on said sliding end jaw to secure a lighting tube on each of the clamping surfaces.

5. The configurable light fixture of claim 4, wherein the clamp section of the rail comprises a rectangular cross-section for keeping the fixed jaw and the one or more sliding intermediate jaws and the sliding end jaw fixedly aligned.

6. The configurable light fixture of claim 4, wherein the clamp section of the rail comprises a square cross-section for keeping the fixed jaw and the one or more sliding intermediate jaws and the sliding end jaw fixedly aligned.

7. A configurable light fixture comprising:
- a rail comprising a clamp section and threaded section, the clamp section having a cross-section selected from one of square, rectangle, triangle, and rhombus;
- a fixed jaw removably coupled to an end of the rail in the clamp section, wherein the fixed jaw comprises a downward facing right angled brace body on the front side;
- a sliding end jaw slidably coupled to the rail in the clamp section below the fixed jaw, wherein the sliding end jaw comprises an upward facing right angled brace body on the front side, wherein the cross-section of the clamp section of the rail keeps the sliding end jaw aligned with the fixed jaw; and
- a wing nut coupled to the threaded section of the rail, wherein the wing nut is configured to apply linear pressure on said sliding end jaw to secure a lighting tube.

\* \* \* \* \*